US008964254B2

(12) United States Patent
Shiffman et al.

(10) Patent No.: US 8,964,254 B2
(45) Date of Patent: Feb. 24, 2015

(54) TO GENERATE A HISTOGRAM MATCHED IMAGE

(71) Applicant: Hewlett-Packard Indigo, B.V., Amstelveen (NL)

(72) Inventors: Smadar Shiffman, Palo Alto, CA (US); Oren Haik, Nes Ziona (IL); Oded Perry, Nes Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 13/856,103

(22) Filed: Apr. 3, 2013

(65) Prior Publication Data
US 2014/0300911 A1    Oct. 9, 2014

(51) Int. Cl.
- *H04N 1/40* (2006.01)
- *H04N 1/409* (2006.01)
- *G06T 5/40* (2006.01)
- *H04N 1/407* (2006.01)

(52) U.S. Cl.
CPC .................... *H04N 1/4074* (2013.01)
USPC ........... 358/3.24; 358/3.26; 358/406; 382/168

(58) Field of Classification Search
None
See application file for complete search history.

(56) References Cited

U.S. PATENT DOCUMENTS

| 7,324,687 | B2 | 1/2008 | Zitnick, III et al. |
| 8,340,420 | B2 | 12/2012 | Smith et al. |
| 2012/0075331 | A1 | 3/2012 | Mallick et al. |
| 2012/0237082 | A1 | 9/2012 | Sengupta et al. |
| 2013/0182972 | A1* | 7/2013 | Jing et al. ................ 382/276 |

FOREIGN PATENT DOCUMENTS

JP          10049680 A  *  2/1998  ............... G06T 7/00

OTHER PUBLICATIONS

JPO machine translation of JP 10049680 A into English.*
Li et al., IRM: Integrated Region Matching for Image Retrieval, Stanford University, downloaded from http://infolab.stanford.edu/IMAGE/SIMPLIcity/ACM00.1/li/ Apr. 3, 2013, 21 pages.

* cited by examiner

Primary Examiner — Scott A Rogers

(57) ABSTRACT

A method to generate a histogram matched image in which a portion of a first reference image is partitioned into a plurality of regions. Histogram matching is performed separately on the plurality of regions of the first reference image and corresponding regions in a second image to generate a plurality of first histogram matched reference images. Histogram matching is also performed on the portion of the first reference image and a corresponding portion in the second image to generate a second histogram matched reference image. An area from one of at least a first histogram matched reference image and the second histogram matched reference image is selected to generate a finalized histogram matched reference image.

20 Claims, 4 Drawing Sheets

TO GENERATE A HISTOGRAM MATCHED IMAGE

BACKGROUND

Printer apparatus are usually arranged to print an image onto media. For example, a printer apparatus may read an image file and control a print engine to print text and/or graphics onto a sheet or roll of media. The image printed on the media may include print defects that result in the printed image having a different appearance to the image file.

BRIEF DESCRIPTION

Reference will now be made by way of example only to the accompanying drawings in which.

DETAILED DESCRIPTION

Figure 1:
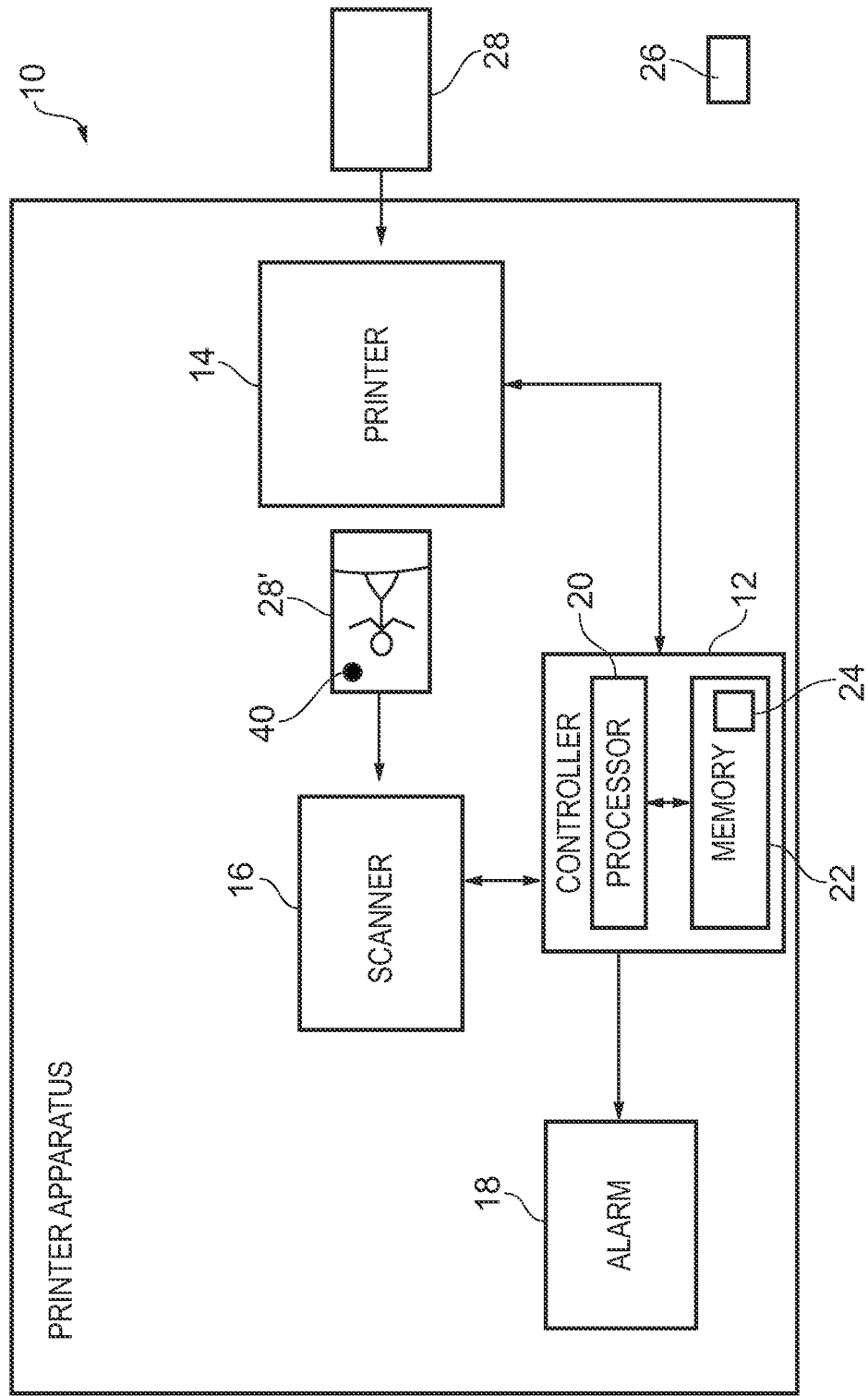
FIG. 1 illustrates a schematic diagram of apparatus according to an example.

FIG. 1 illustrates a schematic diagram of apparatus 10 (which may also be referred to as printer apparatus 10) including a controller 12, a printer 14, a scanner 16 and an alarm 18. The printer apparatus 10 may include a single housing for housing the controller 12, the printer 14, the scanner 16 and the alarm 18 therein. In other examples, the controller 12, and/or the printer 14 and/or the scanner 16 and/or the alarm 18 may have separate housings.

The printer apparatus 10 may be a module in some examples. As used here, 'module' refers to a unit or apparatus that excludes certain parts/components that would be added by an end manufacturer or a user. For example, where the printer apparatus 10 is a module, the printer apparatus 10 may only include the controller 12 (the printer 14, the scanner 16 and the alarm 18 are added by an end manufacturer).

The implementation of the controller 12 can be in hardware alone (for example, a circuit, a processor and so on), have certain aspects in software including firmware alone or can be a combination of hardware and software (including firmware)

The controller 12 may be implemented using instructions that enable hardware functionality, for example, by using executable computer program instructions in a general-purpose or special-purpose processor 20 that may be stored on a computer readable storage medium 22 (disk, memory and so on) to be executed by such a processor 20.

The processor 20 is configured to read from and write to the memory 22. The processor 20 may also comprise an output interface via which data and/or commands are output by the processor 20 and an input interface via which data and/or commands are input to the processor 20.

The memory 22 stores a computer program 24 comprising computer program instructions that control the operation of the printer apparatus 10 when loaded into the processor 20. The computer program instructions 24 provide the logic and routines that enables the printer apparatus 10 to perform the method illustrated in FIGS. 2A and 2B. The processor 20 by reading the memory 22 is able to load and execute the computer program 24.

The apparatus 10 therefore comprises: at least one processor 20; and at least one memory 22 including computer program code 24, the at least one memory 22 and the computer program code 24 configured to, with the at least one processor 20, cause the apparatus 10 at least to perform: partitioning a portion of a first reference image into a plurality of regions; performing histogram matching separately on the plurality of regions of the first reference image and corresponding regions in a second image to generate a plurality of first histogram matched reference images; performing histogram matching on the portion of the first reference image and a corresponding portion in the second image to generate a second histogram matched reference image; and selecting an area from one of at least a first histogram matched reference image and the second histogram matched reference image, to generate a finalized histogram matched reference image.

The computer program 24 may arrive at the printer apparatus 10 via any suitable delivery mechanism 26. The delivery mechanism 26 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 24. The delivery mechanism 26 may be a signal configured to reliably transfer the computer program 24. The printer apparatus 10 may propagate or transmit the computer program 24 as a computer data signal.

Although the memory 22 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

The printer 14 may be any suitable printer for printing an image (including text and/or graphics for example) on a sheet or web of media 28 and may be, for example, an inkjet printer, a dry toner printer, a solid ink printer, or a liquid ink printer. Under the control of the controller 12, the printer 14 is arranged to receive a sheet or web of media 28 (such as paper), print an image on the media 28 using a reference image, and then provide the printed media 28' to the scanner 16.

The scanner 16 may be any suitable image scanner for scanning the printed media 28'. For example, the scanner 16 may include a charged coupled device (CCD) or a contact image sensor (CIS). The controller 12 is arranged to control the scanner 16 to scan the printed media 28', and is also arranged to receive a scanned image of the printed media 28' from the scanner 16.

The alarm 18 may be any suitable device for alerting a user of the printer apparatus 10 that the printed media 28' includes at least one printing defect. For example, the alarm 18 may include a display for notifying a user that the printed media 28' includes a printing defect and may show the printing defect on the display. By way of another example, the alarm 18 may additionally or alternatively include an audio output device that produces acoustic waves to notify a user that the printed media 28' includes a printing defect. The controller 12 is arranged to control the alarm 18 to alert the user to the printing defect.

The operation of the printer apparatus 10 is described in the following paragraphs with reference to FIGS. 2A and 2B.

At block 30, the controller 12 controls the printer 14 to print on the media 28 using a reference image. The printer 14 prints on the media 28 under the control of the controller 12 and subsequently provides printed media 28' having the reference image printed thereon.

Figure 3:
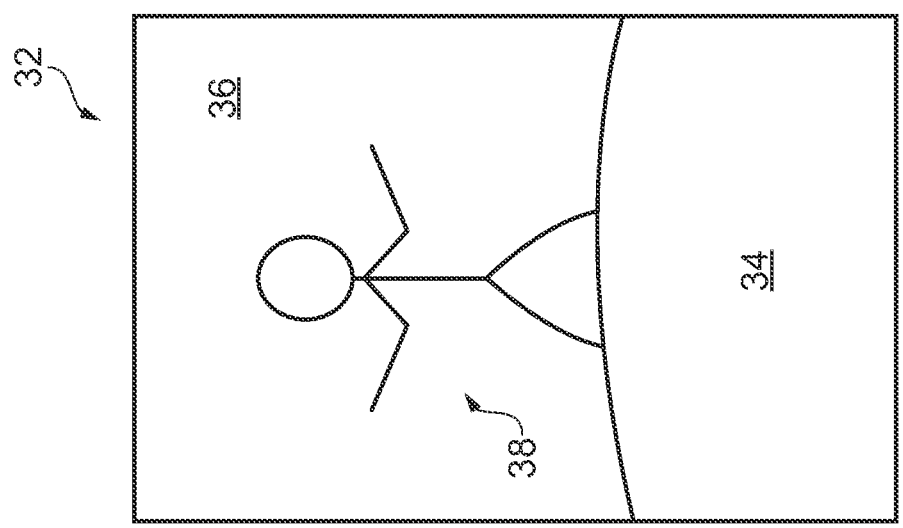
FIG. 3 illustrates a reference image according to an example.

FIG. 3 illustrates a reference image 32 according to an example. The reference image 32 includes a ground section 34 in the lower third of the image, a sky section 36 in the upper two thirds of the image, and a person 38 stood on the ground section 34 in the middle of the image.

As illustrated in FIG. 1, the printed media 28' includes the reference image 32 printed thereon. However, the printed media 28' also includes a printing defect 40 (caused by the printer 14) in the sky section 36 of the printed media 28'. It should be appreciated that the printing defect 40 does not form part of the reference image 32 and therefore causes the image on the printed media 28' to have a different appearance to the reference image 32.

At block 42, the controller 12 controls the scanner 16 to scan the printed media 28' and receives a scanned image of the printed media 28' from the scanner 16. The scanned image may include at least one scanning defect caused by the scanner 16 that results in the scanned image having a different appearance to the reference image 32 and to the image on the printed media 28'.

At block 44, the controller 12 partitions a portion of the reference image 32 into a plurality of regions. The portion may be the whole of the reference image, or may be a part of the reference image (in which case the reference image 32 is also partitioned into a plurality of portions). Furthermore, the controller 12 may partition at least one region of the plurality of regions into a plurality of sub-regions and so on. The partitioning of the reference image 32 results in the partitioned areas (i.e. the portions, regions and sub-regions) being relatively smooth and uniform in intensity (i.e. the partitioned areas have a relatively small range of pixel intensities).

The controller 12 may partition the portion (or other area, such as a region, or sub-region) of the reference image by determining if a pixel parameter (such as intensity) exceeds, or is less than, a threshold value. For example, the controller 12 may determine the difference between the maximum pixel intensity and the minimum pixel intensity of the portion. If the difference is greater than a threshold value, the portion is partitioned into a plurality of regions. If the difference is less than the threshold value, the portion is not partitioned. By way of another example, the controller 12 may determine the standard deviation in intensity of the pixels in the portion. If the standard deviation is greater than a threshold value, the portion is partitioned into a plurality of regions. If the standard deviation is less than the threshold value, the portion is not partitioned. In other examples, the controller 12 may partition a portion using a uniformity criteria such as number of edges in a region, entropy, variance, sum of absolute derivatives or kurtosis.

Figure 4:
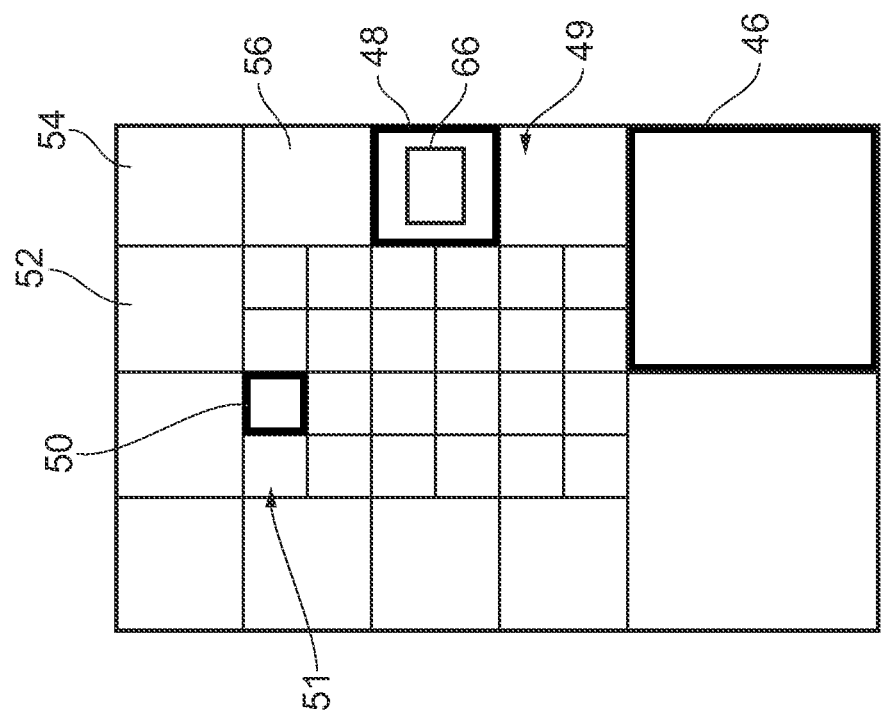
FIG. 4 illustrates a partitioning of the reference image illustrated in FIG. 3, according to an example.

FIG. 4 illustrates a partitioning of the reference image 32 illustrated in FIG. 3, according to an example. The reference image 32 is partitioned into portions, regions and sub-regions using quad-tree decomposition as described in the preceding paragraph. The lower third of the reference image 32 is partitioned into two portions, the center of the reference image 32 is partitioned into a plurality of sub-regions, and a plurality of regions are positioned around the plurality of sub-regions.

An example of a portion is drawn in bold and provided with the reference numeral 46. In this example, the portion 46 corresponds to one sixth of the area of the reference image 32 and is located in the lower right third of the reference image 32. The portion 46 corresponds to a ground section 34 of the reference image 32 which is relatively uniform and has consequently not been further partitioned into regions.

An example of a region is drawn in bold and provided with the reference numeral 48. In this example, the region 48 corresponds to one quarter of the area of the portion 46 and is located in the middle right of the reference image 32. The portion 49 to which the region 48 belongs includes both a sky section 36 and a part of the person 38. Since the portion 49 is not uniform, the controller 12 has split the portion 49 into four regions. The region 48 corresponds to a sky section 36 of the reference image 32 which is relatively uniform and has consequently not been further partitioned into sub-regions.

An example of a sub-region is drawn in bold and provided with the reference numeral 50. In this example, the sub-region 50 corresponds to one quarter of the area of the region 48 and is located in the upper middle of the reference image 32. The region 51 to which the sub-region 50 belongs includes part of the head of the person 38. Since the region 51 is not uniform, the controller 12 has split the region 51 into four sub-regions (including sub-region 50).

At block 44, the controller 12 may additionally combine two or more adjacent regions (or sub-regions) that are uniform relative to one another. For example, the regions 52, 54, 56 may be relatively uniform since they all include the sky section 36 and consequently, the controller 12 may combine the regions 52, 54, 56 into a single partitioned area. The controller 12 may determine that at least two regions are uniform and may be combined by determining if a pixel parameter of the regions exceeds, or is less than, a threshold value as described in the previous paragraphs.

In other examples, the reference image 32 may be partitioned into smaller or larger areas than those described in the preceding paragraphs. For example, in another reference image, a sub-region may be partitioned into a plurality of segments. Additionally, in other examples, the reference image 32 may not be partitioned using quad-tree decomposition and may instead be partitioned according to a different rule. For example, a portion of the reference image 32 may be partitioned into any number of regions (greater than or less than four) and the partitioned regions may have any shape or combination of shapes (for example, the partitioned regions may be square and/or circular and/or rectangular and/or elliptical and/or hexagonal and so on).

At block 58, the controller 12 performs histogram matching separately on the plurality of regions (such as region 48) of the reference image 32 and corresponding regions in the scanned image to generate a plurality of first histogram matched reference images. The histogram matching includes those regions that include sub-regions therein (such as region 51 for example). A corresponding region in the scanned image is a region in the scanned image whose size, shape and location is the same as the region in the reference image.

At block 60, the controller 12 performs histogram matching on at least one portion of the reference image 32 and at least one corresponding portion in the scanned image to generate at least one second histogram matched reference image. Where the reference image 32 is partitioned into a plurality of portions (as illustrated in FIG. 4 for example), the histogram matching is performed separately for the different portions. The histogram matching includes those portions that include regions and sub-regions therein (such as portion 49 for example).

At block 62, the controller 12 performs histogram matching separately on the plurality of sub-regions of the reference image 32 and corresponding sub-regions in the scanned image to generate a plurality of third histogram matched reference images. Where sub-regions includes partitioning therein (not illustrated in the Figs.), the controller 12 performs histogram matching to include those sub-regions.

Blocks 58, 60 and 62 may be performed by the controller 12 in any order. For example, the controller 12 may perform block 60 first, then block 58 and finally block 62. Furthermore, block 62 may be omitted where the reference image 32 is not partitioned into sub-regions. Where the partitioned reference image includes partitioned areas smaller than a sub-region, histogram matching is also performed separately on those areas as described above for the portions, regions and sub-regions.

At block 64, the controller 12 selects an area from one of at least a first histogram matched reference image, and the second histogram matched reference image, to generate a finalized histogram matched reference image. The controller 12 selects the area by comparing the similarity of the corresponding areas in the first histogram matched reference image and the scanned image, and by comparing the similarity of the corresponding areas in the second histogram matched reference image and the scanned image, and then selecting the area from the histogram matched reference image that is most similar to the corresponding area in the scanned image. For example, the controller 12 may select the area from the histogram matched reference image that has the smallest mean squared error in pixel intensity when compared to the scanned image. By way of further examples, the controller 12 may select the area from the histogram matched reference image using an alternative metric such as absolute pixel by pixel norms, difference of the region means, and structural similarity index (SSIM).

For example, for area 66, a first histogram matched reference image has been generated in block 58 for the region 48, and a second histogram matched reference image has been generated in block 60 for the portion 49. The controller 12 compares the similarity of the areas from the first and second histogram matched reference images with the corresponding area in the scanned image and selects the most similar area.

Where an area is also within a sub-region or smaller partitioning, the controller 12 selects the area from the histogram matched reference image that is most similar to the scanned image from the various partitionings that include the area (that is, from the portion, region, sub-region or smaller partitioning histogram matched reference image that include the area).

Block 64 is repeated for different areas until a finalized histogram matched reference image is generated.

At block 68, the controller 12 performs similarity analysis using the finalized histogram matched reference image (generated in block 64) and the scanned image to detect printing defects in the scanned image. For example, the controller 12 may use the structural similarity index method (SSIM) to analyze the similarity of the finalized histogram matched reference image and the scanned image.

If the controller 12 detects at least one printing defect at block 64 (i.e. the finalized histogram matched reference image and the scanned image are not similar), the method moves to block 70 and the controller 12 controls the alarm 18 to alert the user to printing defects on the printed media 28'. The controller 12 may also control the printer 14 to stop printing to prevent the printing defect being printed on further sheets or webs of media.

The printer apparatus 10 may provide an advantage in that by comparing the scanned image with the finalized histogram matched reference image, the impact of scanning defects on the detection of printing defects may be reduced since the reference image is made to look more similar to the scanned image. Furthermore, the finalized histogram matched reference image and the scanned image have an increased color similarity when compared to the reference image and the scanned image. Consequently, the controller 12 may have improved accuracy at detecting printing defects when performing the similarity analysis at block 68. This may enable the printer apparatus 10 to have a lower quality (and therefore less costly) scanner 16 and thereby reduce the cost of the printer apparatus 10.

Figure 2A:
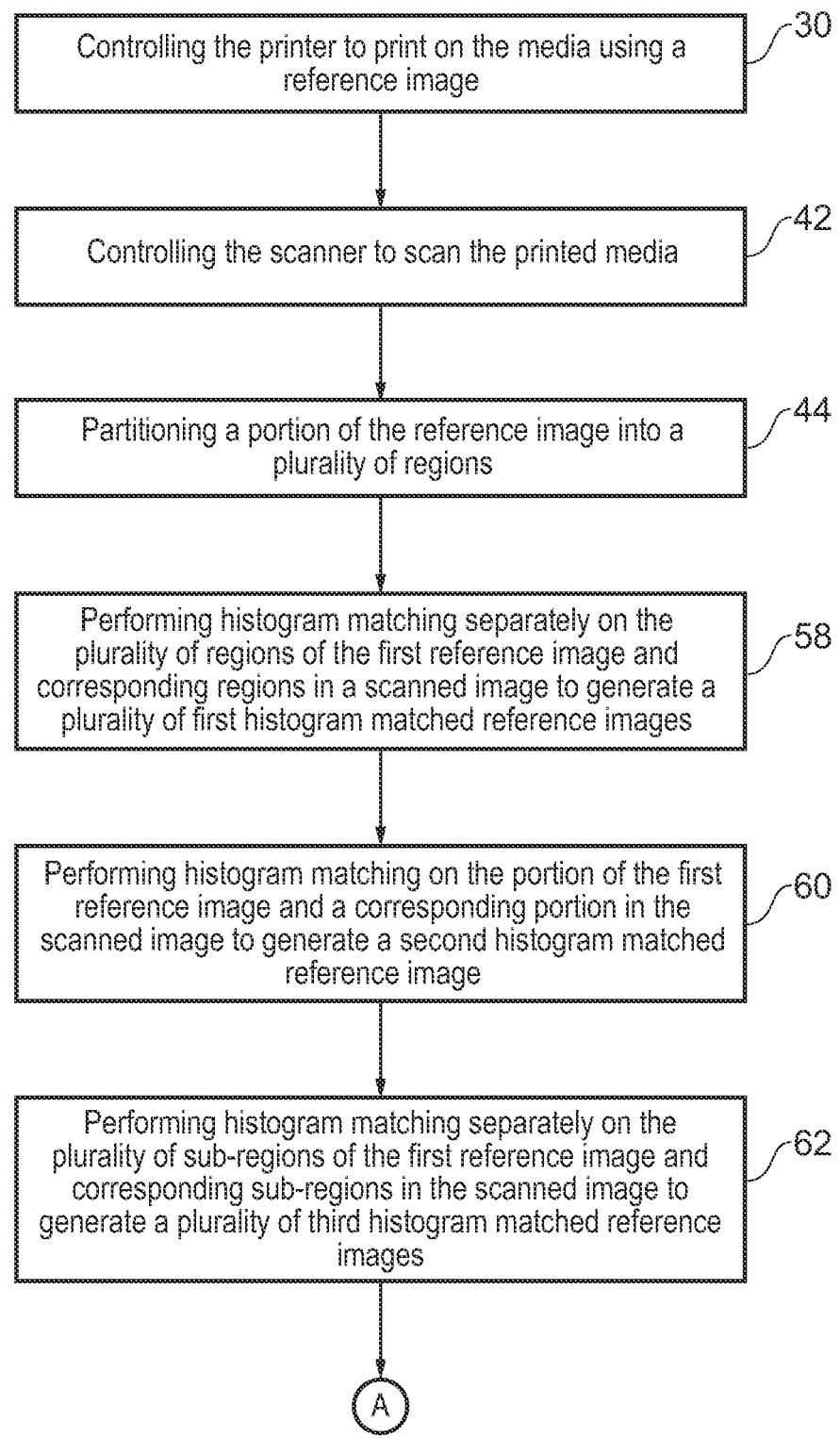
FIGS. 2A and 2B illustrate a flow diagram of a method according to an example.
Figure 2B:
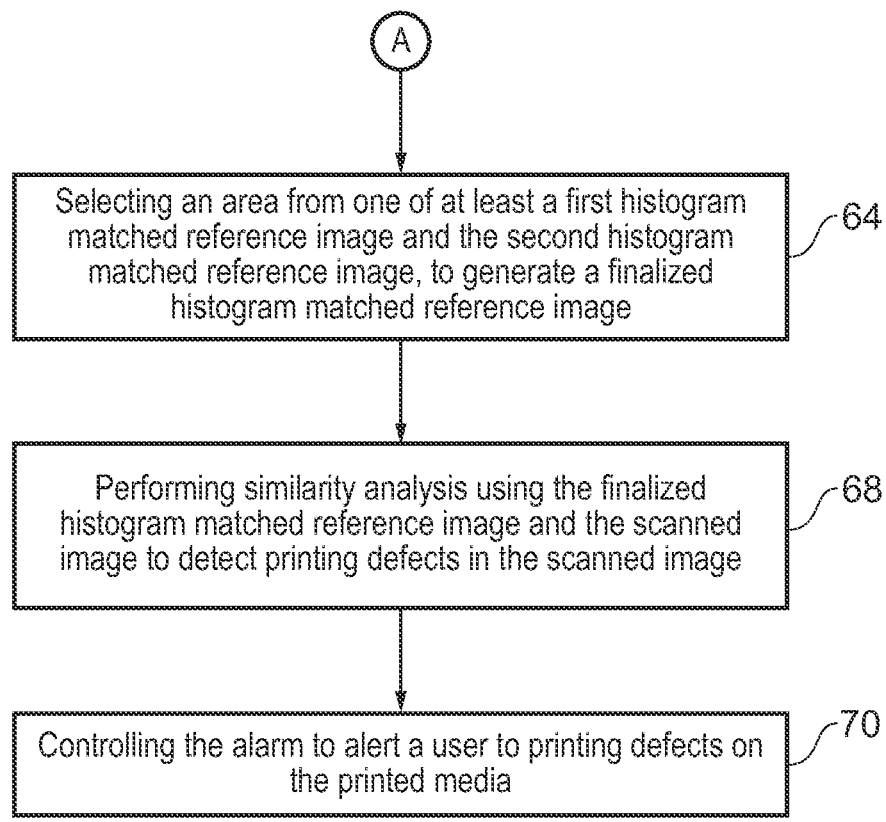

The blocks illustrated in the FIGS. 2A and 2B may represent steps in a method and/or sections of code in the computer program 24. The illustration of a particular order to the blocks does not necessarily imply that there is a required or preferred order for the blocks and the order and arrangement of the block may be varied. Furthermore, it may be possible for some blocks to be omitted.

Although examples of the present invention have been described in the preceding paragraphs, it should be appreciated that modifications to the examples given can be made without departing from the scope of the invention as claimed. For example, the method to generate a finalized histogram matched reference image may be used for various different applications and not just in the detection of printing defects. For example, the method to generate a finalized histogram matched reference image may be used in any application that benefits from having similar image pairs such as searching in image databases and video analytics. In these examples, the histogram matching may not be performed using a scanned image.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method to generate a histogram matched image, the method comprising:
   partitioning a portion of a first reference image into a plurality of regions;
   performing histogram matching separately on the plurality of regions of the first reference image and corresponding regions in a second image to generate a plurality of first histogram matched reference images;
   performing histogram matching on the portion of the first reference image and a corresponding portion in the second image to generate a second histogram matched reference image; and
   selecting an area from one of at least a first histogram matched reference image and the second histogram matched reference image, to generate a finalized histogram matched reference image.

2. A method as claimed in claim 1, wherein the plurality of regions of the first reference image have uniform intensities.

3. A method as claimed in claim 1, further comprising determining if the difference between a maximum intensity value and a minimum intensity value of the portion of the first reference image exceeds a threshold value, the portion of the first reference image being partitioned if the difference exceeds the threshold value.

4. A method as claimed in claim 1, wherein the area selected is determined by:
   comparing the similarity of the area in the first histogram matched reference image with the corresponding area in the second image;
   comparing the similarity of the area in the second histogram matched reference image with the corresponding area in the second image; and
   selecting the area that is most similar to the corresponding area in the second image.

5. A method as claimed in claim 1, further comprising combining two or more adjacent regions that are uniform relative to one another.

6. A method as claimed in claim 1, further comprising: partitioning a region into a plurality of sub-regions; performing histogram matching separately on the plurality of sub-regions of the first reference image and corresponding sub-regions in the second image to generate a plurality of third histogram matched reference images.

7. A method as claimed in claim 6, wherein selecting an area includes selecting an area from one of at least a first histogram matched reference image, the second histogram matched reference image and a third histogram matched reference image.

8. A method as claimed in claim 1, wherein the partitioning includes performing quad tree decomposition of the first reference image.

9. A method as claimed in claim 1, further comprising performing similarity analysis using the finalized histogram matched reference image and the second image to detect printing defects in the second image.

10. An apparatus to generate a histogram matched image, the apparatus comprising a controller to:
    partition a portion of a first reference image into a plurality of regions;
    perform histogram matching separately on the plurality of regions of the first reference image and corresponding regions in a second image to generate a plurality of first histogram matched reference images;
    perform histogram matching on the portion of the first reference image and a corresponding portion in the second image to generate a second histogram matched reference image; and
    select an area from one of at least a first histogram matched reference image and the second histogram matched reference image, to generate a finalized histogram matched reference image.

11. An apparatus as claimed in claim 10, wherein the plurality of regions of the first reference image have uniform intensities.

12. An apparatus as claimed in claim 10, wherein the controller is arranged to determine if the difference between a maximum intensity value and a minimum intensity value of the portion of the first reference image exceeds a threshold value, the portion of the first reference image being partitioned if the difference exceeds the threshold value.

13. An apparatus as claimed in claim 10, wherein the area selected is determined by:
    comparing the similarity of the area in the first histogram matched reference image with the corresponding area in the second image;
    comparing the similarity of the area in the second histogram matched reference image with the corresponding area in the second image; and
    selecting the area that is most similar to the corresponding area in the second image.

14. An apparatus as claimed in claim 10, wherein the apparatus is arranged to combine two or more adjacent regions that are uniform relative to one another.

15. An apparatus as claimed in claim 10, wherein the controller is arranged to: partition a region into a plurality of sub-regions; perform histogram matching separately on the plurality of sub-regions of the first reference image and corresponding sub-regions in the second image to generate a plurality of third histogram matched reference images.

16. An apparatus as claimed in claim 15, wherein selecting an area includes selecting an area from one of at least a first histogram matched reference image, the second histogram matched reference image and a third histogram matched reference image.

17. An apparatus as claimed in claim 10, wherein the partitioning includes performing quad tree decomposition of the first reference image.

18. An apparatus as claimed in claim 10, wherein the controller is arranged to perform similarity analysis using the finalized histogram matched reference image and the second image to detect printing defects in the second image.

19. Printer apparatus comprising:
    a printer to print on media using a reference image;
    a scanner to generate a scanned image of the printed media;
    a controller to partition a portion of the reference image into a plurality of regions, and to perform histogram matching separately on the plurality of regions and corresponding regions of the scanned image to generate a plurality of first histogram matched reference images, and to perform histogram matching on the portion of the reference image and a corresponding portion in the scanned image to generate a second histogram matched reference image, and to select an area from one of at least a first histogram matched reference image and the second histogram matched reference image to generate a finalized histogram matched reference image, the controller being arranged to detect a printing defect in the printed media by comparing the scanned image with the finalized histogram matched reference image.

20. Printer apparatus as claimed in claim 19, further comprising an alarm to indicate that a printing defect has been detected on the printed media.

* * * * *